United States Patent [19]

Yamazaki et al.

[11] Patent Number: 4,475,616
[45] Date of Patent: Oct. 9, 1984

[54] ENGINE COVER DEVICE FOR LIGHT VEHICLES

[75] Inventors: Sho Yamazaki, Tokyo; Kazutoshi Matsumoto, Saitama; Hideo Ochiai, Tokyo, all of Japan

[73] Assignee: Honda Giken Kogyo Kabushiki Kaisha, Tokyo, Japan

[21] Appl. No.: 411,534

[22] Filed: Aug. 25, 1982

[30] Foreign Application Priority Data

| Aug. 26, 1981 [JP] | Japan | 56-134679 |
| Aug. 27, 1981 [JP] | Japan | 56-134499 |
| Sep. 9, 1981 [JP] | Japan | 56-141913 |
| Sep. 10, 1981 [JP] | Japan | 56-134518[U] |

[51] Int. Cl.³ .................. B60K 11/08; B62J 15/00; B62K 5/04
[52] U.S. Cl. .................. 180/215; 180/68.3; 180/69.3
[58] Field of Search ............ 180/215, 68.1, 68.3, 180/69.24, 62.25, 69.3; 296/78.1; 280/152.1, 154.5 A

[56] References Cited

U.S. PATENT DOCUMENTS

| 2,175,528 | 10/1939 | Klavik | 180/68.1 |
| 2,721,745 | 10/1955 | Torre | 180/69.3 |
| 2,891,370 | 6/1959 | Musgrave | 180/68.1 |
| 3,796,277 | 3/1974 | Gordon | 180/68.3 |
| 4,372,417 | 2/1983 | Yamamoto et al. | 180/215 |

*Primary Examiner*—Joseph F. Peters, Jr.
*Assistant Examiner*—Donn McGiehan

*Attorney, Agent, or Firm*—Irving M. Weiner; Pamela S. Burt; Anthony L. Cupoli

[57] ABSTRACT

An engine cover device for light vehicles including a cover main body for use in covering a driven wheel and a power unit from the outsides thereof, a first partition wall for separating the driven wheel and the power unit, and a second partition wall for separating a muffler and other associated equipment units for the engine such as an air cleaner, a carburetor and the like. The second partition wall is arranged such that a space for the installation of the muffler is formed at a rear part of an air discharge port of a forced air cooling device for the engine, and the front part of the cover main body is projected outwardly as it is extended from its front end toward its rear part so as to provide for formation of an air communication hole at the side surface of the cover.

The engine cover device is useful for protecting the associated equipment units for the engine against mud, water, and dust, and also protecting other peripheral units of the engine from high temperatures generated by the muffler, the engine cover device being suitable for cooling an interior of the cover and in particular for providing an efficient cooling of the muffler.

The engine cover device is provided with a resilient member for biasing a split-type cover member constituting a part of the cover main body toward an engaged position with its supporting member and thereby a positive holding of the split-type cover member may be made when it is to be assembled.

12 Claims, 11 Drawing Figures

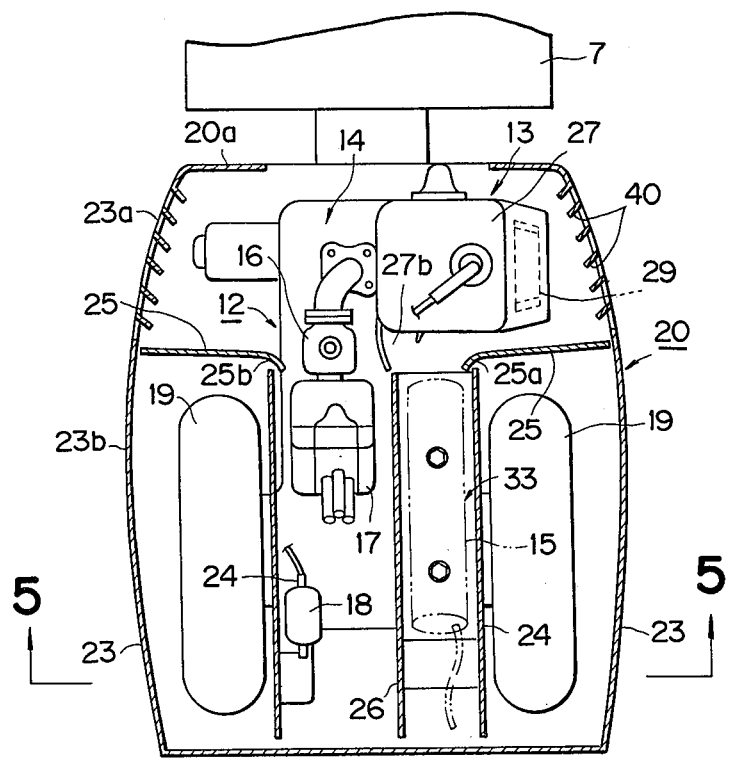
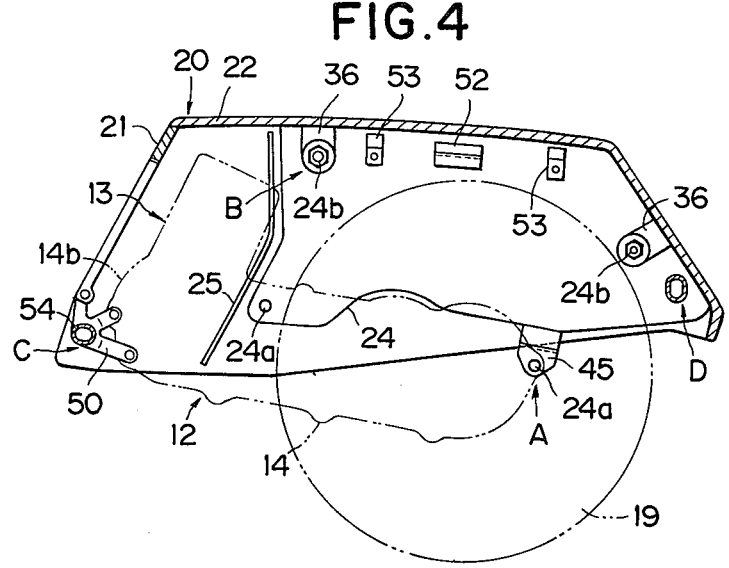

ENGINE COVER DEVICE FOR LIGHT VEHICLES

BACKGROUND OF THE INVENTION

1. Field of the Invention

The present invention relates to an engine cover device for a vehicle, and more particularly an engine cover for use in two-wheeled, three-wheeled or four-wheeled motor vehicle having a small volume of discharge.

2. Description of Relevant Art

In a motor vehicle of a scooter type, it is well known to provide a light vehicle in which a power unit and a rear wheel driven by the power unit are covered by a cover in order to improve the outer appearance of the vehicle and protect the component elements of the vehicle.

In such a vehicle as mentioned above, an engine, a rear wheel, a muffler, an air cleaner, a carburetor and electrical equipment units and the like are stored in a space covered by the cover. The cover is required so as to protect the associated equipment units from mud splashed from the rear wheel, water, or dust, as well as temperatures generated by the engine and the associated equipment units. The cover is preferably a split-type cover to facilitate maintenance of the power unit, associated equipment units and suspension and the like, and it is necessary to provide easy assembly and removal of the cover and to ensure a positive holding is the assembled condition when the cover is assembled.

The present invention provides a cover device which effectively meets the foregoing demands.

SUMMARY OF THE INVENTION

The present invention provides an engine cover device for a light vehicle including at least one front wheel, at least one rear wheel, a power unit havng an integrally assembled engine for driving the rear wheel and a transmission case, wherein there is provided a cover main body for covering a rear wheel and a power unit from the outside portions thereof, a first partition wall arranged in the cover main body so as to separate the rear wheel from the power unit, and a second partition wall arranged in the cover main body so as to separate the associated equipment units for the power units. The associated equipment units do not include a muffler. The muffler is installed in a space formed between the first partition wall and the second partition wall, and said space is formed at the rear part of the surrounding air outlet port of the forced air cooling device having a fan therein. The front part of the cover main body is formed to be projected more outwardly at its side portion than a front end of the cover main body and said front portion is provided with a communication hole for the interior and outside of the cover. The cover main body comprises a plurality of separated cover members, at least one of the separated cover members being provided with an engaging member, the first partition wall being provided with a receiving member, and either one of the separated cover member and the first partition wall being provided with a resilient member for use in biasing the separated cover members in an engaging direction of the engaging member and the receiving member.

It is a major object of the present invention to provide an engine cover device for a vehicle in which the mud splashed from the wheel, water and dust and the like may be prevented from being entered into the associated equipment units for the engine and other associated equipment units may be protected against the hot atmosphere generated in the muffler.

It is another object of the present invention to provide an engine cover device for a vehicle in which air used for forced cooling of the engine is guided around the muffler so as to perform an effective cooling of the muffler.

It is still another object of the present invention to provide an engine cover device for a vehicle in which surrounding air is introduced into the cover during actual operation of a vehicle, and thereby each of the equipment units in the cover may be effectively cooled.

It is yet a further object of the present invention to provide a split-type engine cover for a vehicle in which assembly and removal thereof may easily be performed and the cover may be positively assembled.

It is yet a still further object of the present invention to provide an engine cover device for a vehicle in which the above-mentioned objects may be met with a simple structure without increasing a space in the cover.

The above objects and other objects and features of the present invention will become apparent from the following detailed description of the preferred embodiments of the present invention which will be made with reference to the accompanying drawings.

BRIEF DESCRIPTION OF THE DRAWINGS

FIG. 3 is an illustrative plan view in section showing an engine cover device of the present invention along with rear wheels, a power unit and associated equipment units thereof.

FIG. 4 is an illustrative longitudinal side elevational view in section showing a condition in which an engine cover device of the present invention is fixed to and supported by a power unit.

DETAILED DESCRIPTION OF THE INVENTION

Figure 1:
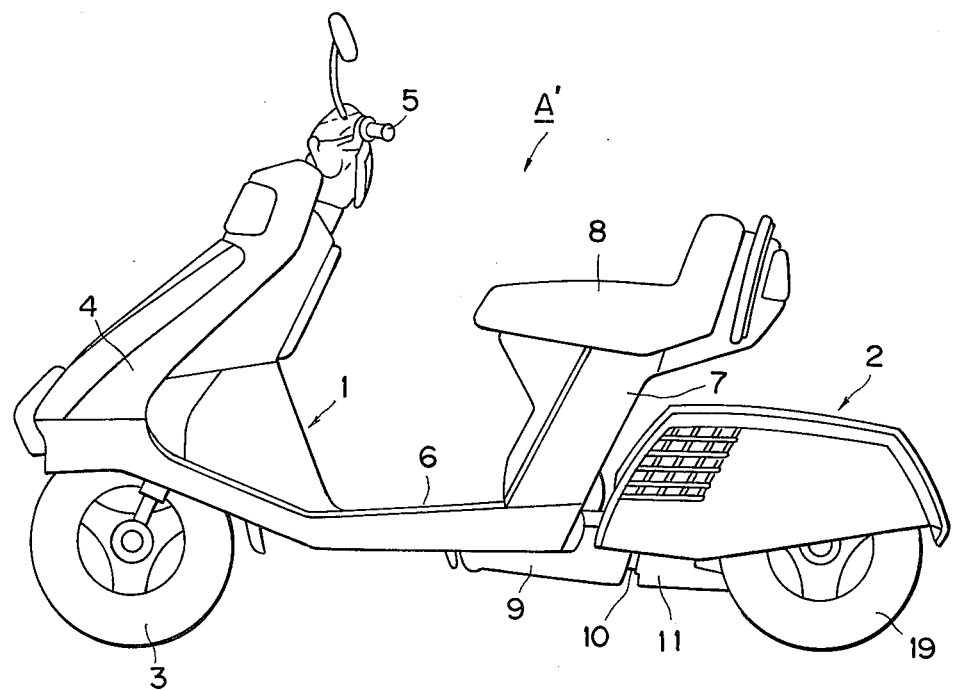
FIG. 1 is a side elevational view showing an exemplary light motor vehicle of a scooter type provided with an engine cover device constructed in accordance with the present invention.
Figure 2:
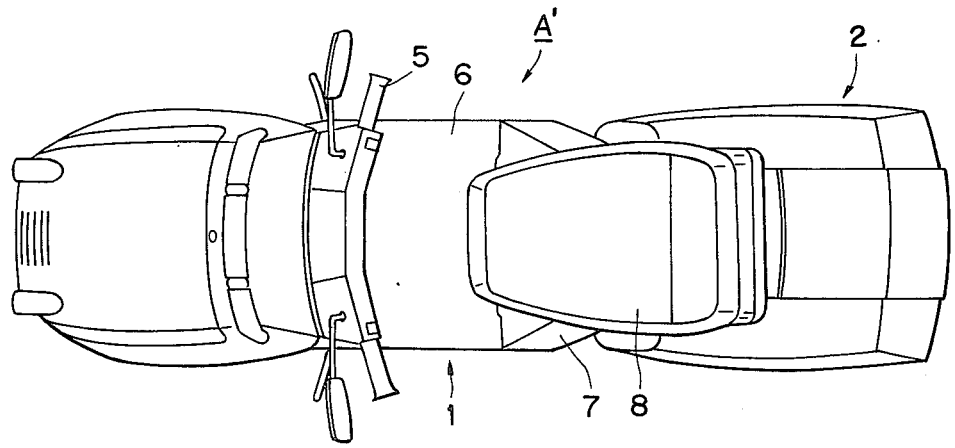
FIG. 2 is a top plan view of FIG. 1.

With reference to FIGS. 1 and 2 there is shown a light scooter-type motor vehicle A'. The vehicle A' comprises a front vehicle body 1 and a rear vehicle body 2. At the front end of the front vehicle body 1 is arranged a leg shield 4 and at the upper part of leg shield 4 is operatively arranged a steering handlebar 5. The handlebar 5 is connected to a front wheel 3 for use in steering one wheel through a steering stem and a front fork (both of which are not shown) which are longitudinally arranged in the leg shield 4. At the rear part of a flat low type floor 6 is installed a seat post 7 having a seat 8 at its upper part. At a rear lower part of the front vehicle body 1 is installed a joint 9 in such a manner as to permit swinging in a vertical direction (a swinging movement). The joint 9 is connected to a rear frame 11 of the rear vehicle body 2 through a longitudinal supporting shaft 10, and the front vehicle body 1 may be swung in a rightward or a leftward direction (rolling movement) around the supporting shaft 10.

Figure 6:
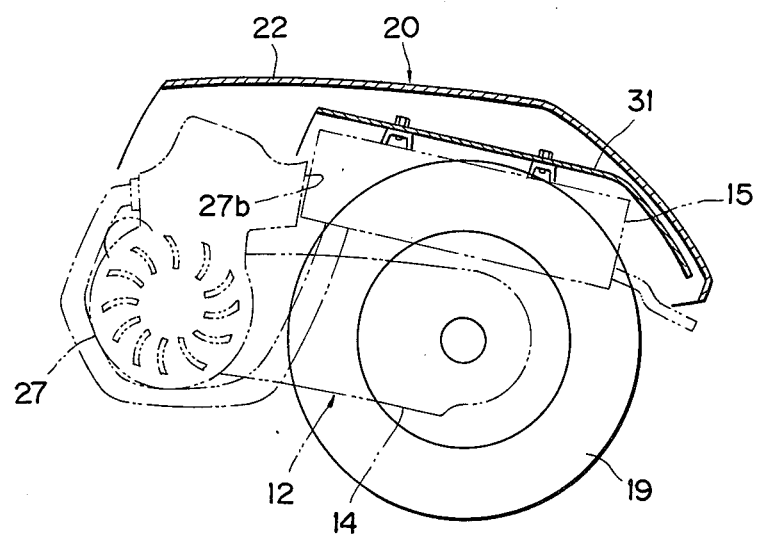
FIG. 6 is an illustrative longitudinal side elevational view in section showing a relation between a surrounding air discharge port of a shroud and a muffler.

On the rear frame 11 is mounted a front lower part of a power unit 12 comprised of an engine 13 and a transmission case 14 as shown in FIGS. 3 and 4. The engine 13 is mounted at a right side of an axial line of the vehicle body as shown in FIG. 3 and the transmission case 14 is mounted at a left side of an axial line of the vehicle body. The transmission case 14 is extended rearwardly from a side part of the engine 13 and includes a crank case. Muffler 15 is rearwardly extended from the engine 13 (FIG. 6). Above the transmission case 14 is arranged a carburetor 16, an air cleaner 17 and electrical unit 18 and the like in such a manner as to be parallel with the transmission case 14 starting from front part to the rear part thereof. At the rear right and left sides of the transmission case 14 are arranged two rear wheels 19 for use in driving the vehicle.

The power unit 12 and the upper part of the rear wheel 19 are covered by a cover 20.

Figure 5:
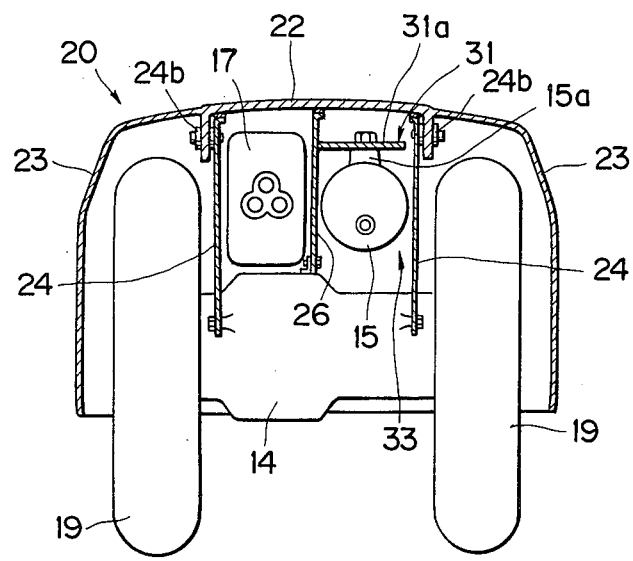
FIG. 5 is a sectional view taken along line 5—5 of FIG. 3.

As apparent from FIG. 4, the cover 20 covers a front plate 21 at a front part of the engine, the engine 13 at the upper end of the front plate, and the transmission case 14. The cover 20 extends to a rear part of the transmission case 14, and comprises a central plate 22 with its rear end being bent rearwardly and downwardly, and symmetrical right and left side plates 23, 23 (FIG. 3) arranged at a right side and a left side of the central plate 22 and covering both sides of the power unit 12 and outer upper half portions of the right and left rear wheels 19, 19, with each of such members being fixed to and supported by the power unit 12. At the inner side of the right and left rear wheels 19, 19 within the cover 20 are arranged partition plates 24, 24 for separating the rear wheels 19, 19 from a space between the rear wheels. As shown in FIGS. 4 and 5, the partition plates 24, 24 are fixed at 24a at a plurality of lower parts in the transmission case 14 of the power unit, and the upper portions thereof are fixed at 24b at both sides of the central member 22 so as to provide a supporting member for the central member. Partition plates 24, 24 are arranged at a higher position than that of both upper side portions of the transmission case 14 of the power unit 12, and thereby the air cleaner 17, muffler 15 and the like mounted on the transmission case 14 between the rear wheels are protected from the rear wheels 19, 19 so as to prevent mud, water and dust, etc. from entering into such operational component elements. At the forward portions of the rear wheels 19, 19 are installed mud protector plates 25 for connecting the inside parts of the side plates 23, 23 to the front ends of the partition plates 24. At the intermediate part between the partition plates 24, 24, and between the air cleaner 17 and the muffler 15 is mounted a longitudinally extending partition plate 26, and thereby the muffler 15, carburetor 16, air cleaner 17, electrical unit 18 and the like are separated from each other. Thereby, atmosphere around the muffler 15 is separated from other adjacent operational component elements so as to protect same from a thermal influence.

Figure 7:
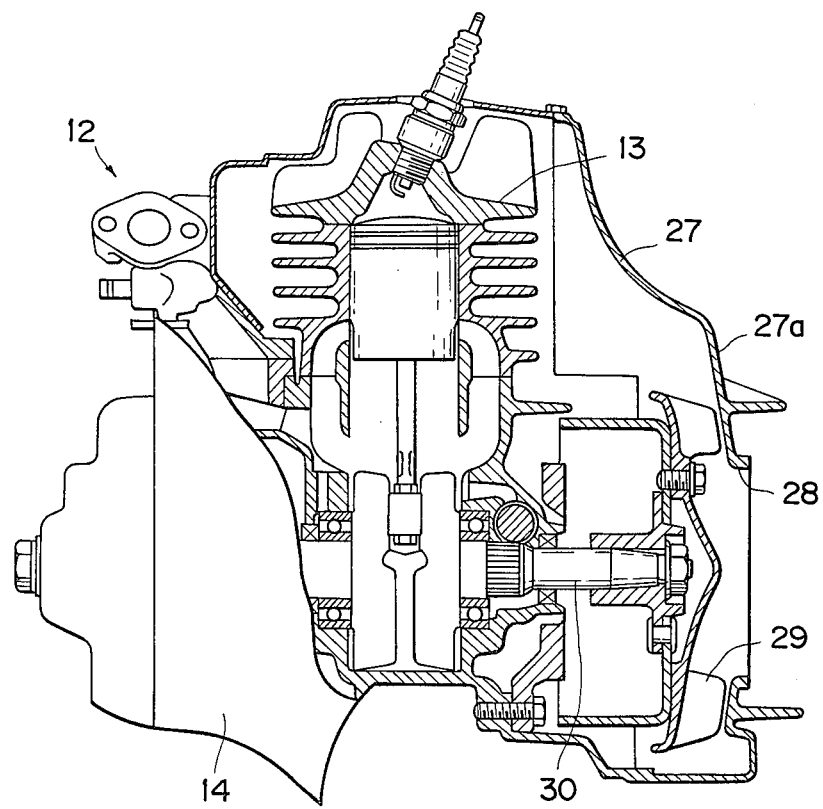
FIG. 7 is a view showing an engine of a power unit in section and partly broken away.

The engine 13 comprises an air-cooled engine around which is installed a shroud 27 of a guide member for use in guiding the cooling air as shown in FIG. 7. At one side wall 27a of the shroud 27 is formed a surrounding air inlet port 28. The surrounding air inlet port 28 is disposed opposite to one side piece of the cover 20. Cooling fan 29 mounted at an output end of the crank shaft 30 is adjacent to the inside part of the air inlet port 28. The shroud 27 covers a peripheral side part and an upper part of the engine 13, as shown in FIG. 6, and its outlet port 27b is extended at an upper rear part thereof. The outlet port 27b is disposed at a right side as shown in FIG. 3 in the same manner as the engine and is opened at a rear part thereof, and in turn the muffler 15 is longitudinally arranged at a rearward part of the outlet port 27b, i.e., muffler 15 is arranged within a space at the upper portion in the cover 20 and at a rearward portion of the engine. In FIGS. 3 and 5, the muffler 15 is disposed at a right side of a central axis in a vehicle width direction and the air cleaner 17 is disposed at a left side adjacent to the muffler 15, and the partition plate 26 is suspended downwardly along its longitudinal dimension between the muffler and the air cleaner. The partition plate 26 is extended rearwardly on the transmission case 14 substantially along an axial line of the vehicle and has a substantially flat lateral plate 31 at one side thereof, i.e., its right side as viewed in FIG. 5, and a bracket 15a of the muffler 15 is supported by the lateral plate 31 with bolts or the like. The partition plate 26 is fixed to and supported by the transmission case 14 and the like. Thereby, a passage 33 having its front end communicating with the outlet port 27b of the shroud 27 and its rear end opened rearwardly is formed by the partition plate 26 and lateral plate 31, and further a passage 35 is formed between the partition plates 24, 26.

The cooling fan 29 is rotatably driven under an operation of the crankshaft 30 of the engine 13 and the surrounding air is taken into the shroud 27 at the inlet port 28 under a rotational operation of the cooling fan 29. The entering cooled air flows around the cylinder block of the engine 13 and the like so as to cool the same and at the same time the cooling air is forcedly fed from the outlet port 27b in a rearward direction, passed through the passage 33 formed around the muffler 15 and then discharged in a rearward direction, resulting in the muffler 15 being forcedly cooled by a longitudinal flow of the forced cooling air in the passage 33. The cooling air is separated from the surrounding air by the partition plate 26 and its lateral plate 31, so that the cooling air does not contact the air cleaner, carburetor and the like, and provides an efficient and effective cooling of only the muffler 15. Hot air warmed by the muffler 15 does not contact these component elements and further a radiation heat of the muffler 15 is shut off by the partition plate 31.

In this manner, an efficient and effective cooling of the muffler 15 is performed with the muffler being covered by the cover 20 and utilization of the forced cooling air for the engine, and adjacent equipment or units may be protected against a thermal influence of the muffler. The partition plate is utilized so as to perform a forced cooling, so that the adjacent equipment or units and the muffler may be adjacent to each other so as to provide an advantageous effect in space utilization as well as a compact sized outer appearance, effective overall use of space in the vehicle, and a concentrated arrangement of the engine muffler and the adjacent equipment or units, and provides a simple structure with only one forced cooling means being required.

With reference to FIG. 3, it is apparent that a width of a front end 20a of the cover 20 is slightly larger than a width of the seat post 7, and a front part 23a of the side plate 23 which is continuous with the front end 20a is bulged out as it approaches the intermediate part 23b and is further bent in an outward direction. In this manner, the front part 23a of the side plate which is bulged out more outwardly than the front end 20a is formed with a louver 40 for use in communicating the surrounding air with the interior of the cover. In the interior space of the cover 20 at the part 23a in which the louver 40 is formed is arranged the engine 13 and the front part of the transmission case 14, even though the space is divided by the mud protector plate 25 from the rear wheels 19, the inner end 25a of the right mud protector plate 25 as viewed in FIG. 3 being adjacent to the passage 33 and an inner end 25b of the left mud protector plate being adjacent to the passage 35, respectively.

With this arrangement, air flowing through the louver 40 into the cover 20 during operation of the vehicle further flows into the shroud 27 at the inlet port 28 through fan 29 so as to cool the engine and on the one hand further flows around the shroud into the passage 33 along the right mud protector plate 25 and cools the muffler along with another flow which is forcedly blown out from the shroud outlet port 27b, and on the other hand flows into the passage 35 along the left mud protector plate 25 to cool the air cleaner 17 and the like.

Therefore, the engine and its associated peripheral equipment units are effectively cooled while being provided with cover 20, and a thermal influence on such component elements may be prevented with a simple structure.

A method for fixing the cover 20 to the rear vehicle body 2 will be described in detail hereinbelow.

Figure 8:
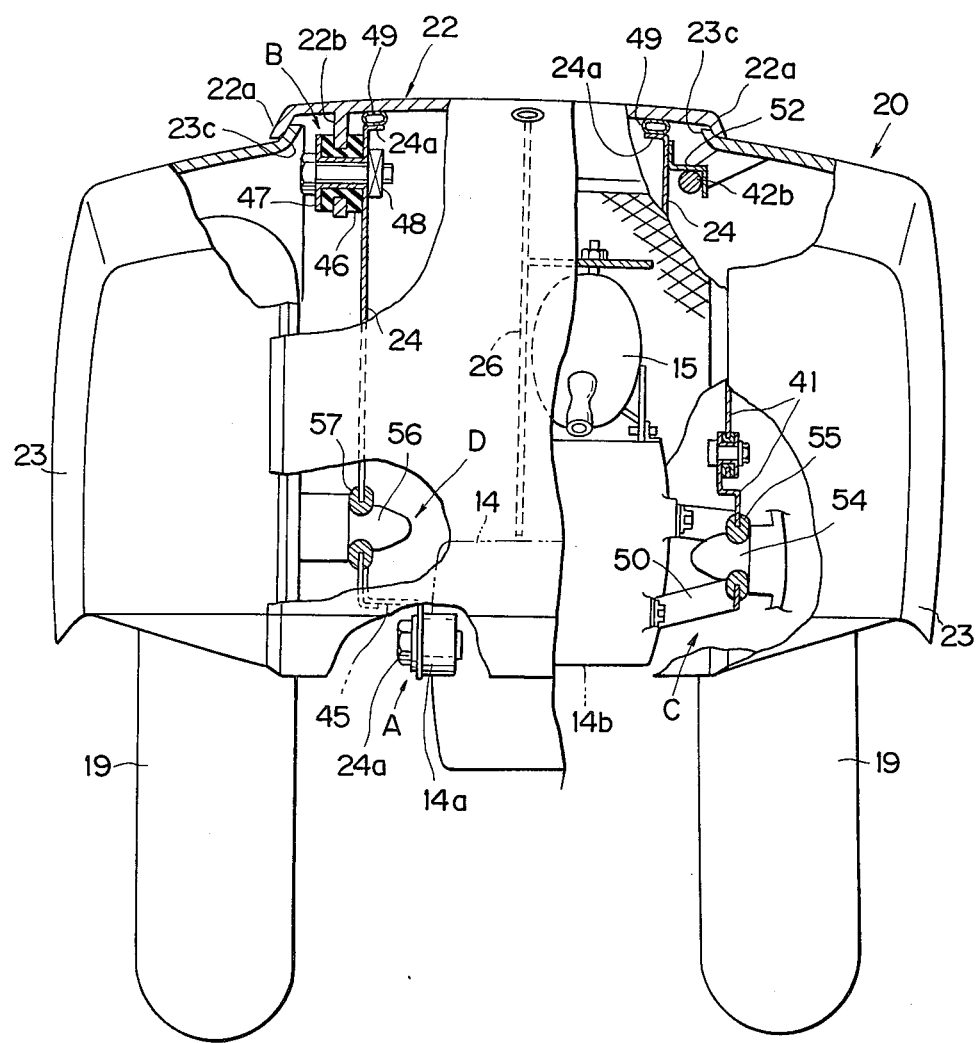
FIG. 8 is an illustrative rear view, partly broken away, showing an assembled condition of a split-type engine cover device of the present invention and the mounting condition thereof relative to a power unit.

With reference to FIGS. 8 and 4, a front part and a rear part of each of the lower portions of the partition plates 24, 24 are fixed by bolts 24a to the fixing boss 14a of the transmission case 14 for the power unit 12. Part A in FIG. 8 shows a view in which the part A in FIG. 4 is viewed from a rear portion of the vehicle, and a rear portion of the transmission case 14 supports a rear lower part of the partition plate 24 through L-shaped stay 45. FIG. 8 shows a left side of the partition plate, and a right side of the partition plate may similarly be installed. Partition plates 24, 24 are longitudinally arranged so as to act as a fixing and supporting member for cover 20. At the intermediate part of the central plate 22 in the cover 20 and also at both rear side portions are integrally suspended and projected a plurality of fixing pieces 36. The fixing pieces 36 are fixed at the front and rear upper portions of the right and left partition plates 24 through rubber bushings 46, collars 47 and bolts/nuts 48. At the upper ends of the partition plates 24 are provided each of the inward bent flange portions 24a, and a cushion member also acting as a rubber seal 49 is installed between the flange and a lower surface of the central plate 22. The connected portion is shown broken away in FIG. 8 corresponding to the part B in FIG. 4. The lower right and left portions of the front plate 21 are fixed to the front end of the crank case 14b at a front part of the transmission case 14 with a stay 50 and the supporting plate 41, as shown at the part C in FIG. 4 and also in section in FIG. 8. Thus, the central plate 22 is fitted and supported at the transmission case.

Figure 9:
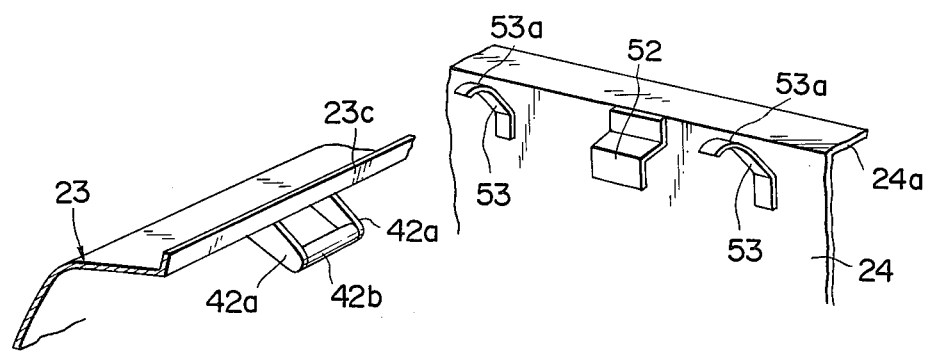
FIG. 9 is an exploded perspective view showing a fixing structure at top portions in side plates of a split-type engine cover device of the present invention.

At the intermediate part and both rear ends of the central plate 22 are arranged flange parts 22a which are bent and suspended in a slanted downward and outward direction, and attachment pieces 22b are spaced apart at the inside of the flange parts 22a. In turn, as clearly shown in FIG. 9, at the inner end of the side plate 23 is arranged a flange part 23c which is bent and raised in a slanted upward direction, a pair of stay pieces 42a are longitudinally projected at the lower surface of the longitudinal intermediate part of the flange 23c1, and an engaging piece 42b having a circular section is longitudinally arranged at the leading ends of the stay pieces. At the intermediate part of the upper outer surface of the partition plate 24 is installed an inverted L-shaped hook 52 opened downwardly, and springs 53 such as leaf springs, etc. having upper bent free ends 53a are arranged at forward and rearward positions of the hook 52.

Figure 10:
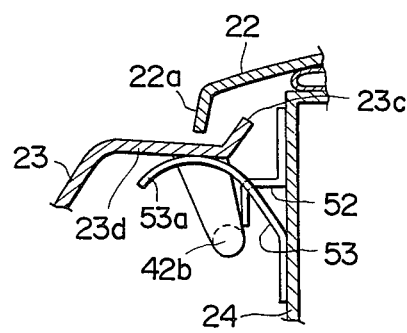
FIGS. 10 and 11 depict a sectional view showing a condition of upper parts of side plates just before they are assembled and a condition in which such assembly is completed, respectively.
Figure 11:
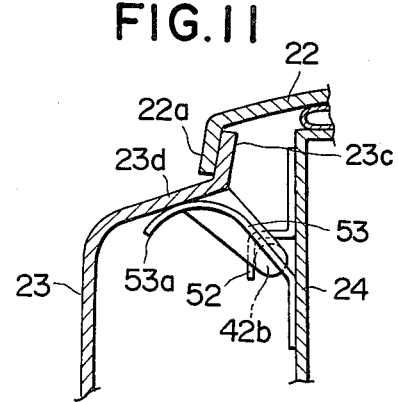

The side plate 23 is installed such that the flange 23c is inserted below both flanges 22a of the central plate 22 as shown in FIG. 10, and a lower surface of the flat part 23d outside of the flange 23c is abutted against a leading end 53a of a spring 53. The flat part 23d is depressed down against the spring and the engaging part 42b is inserted into the hook 52 from therebelow. In FIG. 11 is illustrated a depressed condition of the lower surface of the flat top part 23d caused by the inserted spring 53. Next, an assembly of the lower part of the side plate 23 will be described. Each of the side plates 23 is provided with an engaging projection 54 at the front lower inner part thereof in advance, which is engaged with grommet 55 made of rubber or the like and arranged in the stay 50 as shown in the part C of FIGS. 4 and 8, and a projection 56 is similarly arranged at the rear lower part thereof, the grommet 57 being similarly arranged at the rear lower part of the partition plate 24 and engaged therewith. Such arrangement is shown at part D in FIG. 4 and its section is shown in FIG. 8.

In this manner, the side plate 23 forms a side part of the cover 20 while being resiliently fixed to the partition plate 24 and the side plate is resiliently depressed by a spring, so that even if the power unit 12 is vibrated, it is forcedly and positively supported. When the side plate is to be removed, the projections 54, 56 are pulled out from the grommet 55, 57 and the side plate may easily be removed only by pulling it up, and further when the side plate is to be fitted, it may easily be assembled and again removed due to its relatively inverted order of assembling and removal.

Firm and positive connection of the plates when they are assembled is thus effected, and they will not be removed due to vibration and shock. The cover is of a split-type, so as to advantageously form a simple structure with facilitated assembling and fitting.

What is claimed is:

1. In a light vehicle having at least one front wheel, at least one rear wheel, and a power unit for driving said rear wheel and having an integrated assembly of an engine and transmission case, a cover device comprising:

a cover main body for covering said rear wheel and said power unit from outside thereof;

a first partition wall arranged in said cover main body so as to separate said rear wheel from said power unit; and a second partition wall arranged in said cover main body so as to separate associated equipment units of said engine from each other.

2. A cover device according to claim 1 in which said first partition wall is fixed to said transmission case, and extends substantially vertically in a longitudinal direction of the vehicle body.

3. A cover device according to claim 2 in which said associated equipment units of said engine are arranged on said transmission case.

4. A cover device according to claim 2 in which said associated equipment units of said engine include at least a muffler, an air cleaner and a carburetor, and said second partition wall is arranged between said muffler and said air cleaner along with said carburetor.

5. A cover device according to claim 4 in which said second partition wall extends substantially vertically in a longitudinal direction of the vehicle body, said muffler is arranged in a space formed between said first partition wall and said second partition wall.

6. A cover device according to claim 5 wherein: said engine is provided with a forced air cooling means having a surrounding air inlet port with a fan and a discharge outlet port so as to cover a peripheral part of said engine; and said second partition wall forms a space having said muffler arranged therein at a rearward part of said discharge port of said forced air cooling means, whereby the cooling air for said engine also flows around said muffler.

7. A cover device according to claim 5 in which said second partition wall is provided with a substantially flat extending lateral plate at one side thereof, and said muffler is supported by said lateral plate.

8. A cover device according to claim 1, 2, 3, 4, 5, 6 or 7, wherein:
a front part of said cover main body has a side surface extending further outwardly than a width dimension of the front end thereof; and
said side surface is provided with a communication hole for communicating between the interior of said cover and the exterior thereof.

9. A cover device according to claim 8 in which a third partition plate extending in a vehicle width direction at a front part of said rear wheel is arranged between a side wall of a front part of said cover main body and a front end of said first partition wall.

10. A cover device according to claim 9, wherein:
said engine of said power unit and the front part of said transmission case are arranged at a front part in said cover main body;
at the intermediate part and the rear part of said cover main body is arranged a rear projecting part of said transmission case;
said at least one rear wheel is a pair of rear wheels;
said rear wheels are arranged at each of the sides of said transmission case with said first partition plate being disposed therebetween;
said engine and the associated equipment units thereof are arranged on the projecting end part of said transmission case; and
said third partition wall extends in said vehicle width direction within said cover main body.

11. A cover device according to claim 2 in which said cover main body is comprised of a plurality of split-type cover member,
at least one of said split-type cover members is provided with an engaging member,
said first partition wall is provided with means for engaging with said engaging member,
either one of said split-type cover members provided with said engaging member or said first partition wall is provided with a resilient means for biasing said split-type cover members having said engaging member in an engaging direction between said engaging member and said engaging means.

12. A cover device according to claim 11 in which said resilient means is arranged at said first partition wall.

* * * * *